Feb. 13, 1951    C. L. THOMPSON    2,541,793
ADJUSTABLE SUPPORT
Filed Aug. 26, 1946
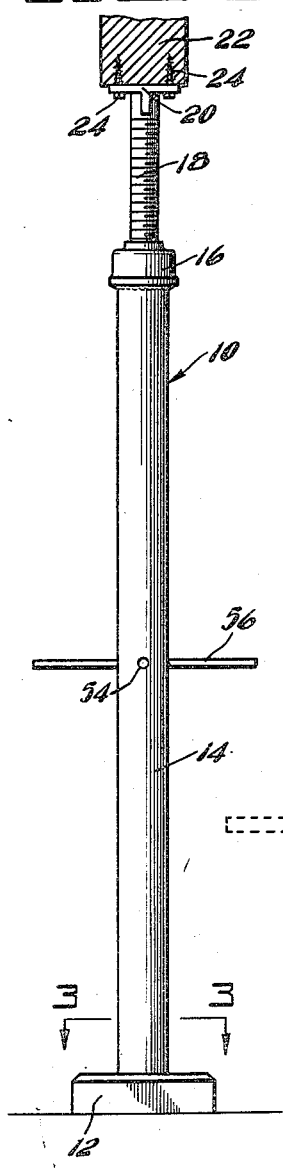
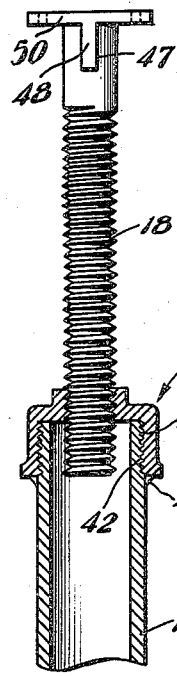
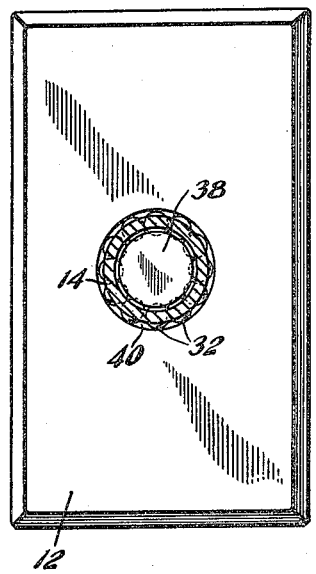
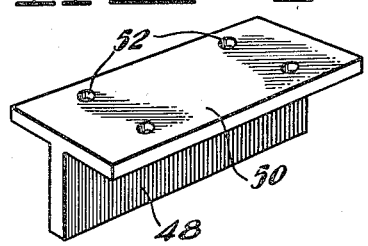
Inventor
Charles L. Thompson
By Clarence A. O'Brien
and Harvey B. Jacobson
Attorneys Patented Feb. 13, 1951

2,541,793

UNITED STATES PATENT OFFICE 2,541,793

ADJUSTABLE SUPPORT

Charles L. Thompson, South Charleston, W. Va.

Application August 26, 1946, Serial No. 693,161

4 Claims. (Cl. 248—354)

My invention pertains to an adjustable support and more specifically has reference to a support element which may be readily adjusted to vary its length, and which is intended for permanent or temporary installation as a support or post for construction work and the like.

The principal objects of my invention are to provide a support for construction or other uses which may be readily attached in operative position; which may be easily adjusted at any time during its installation to vary its length; which is adapted to remain as a permanent support or post in such installations as supporting the sills or beams of a floor, construction forms or the like; which may be readily disassembled for convenient transportation; and which is provided with a novel and dependable means to minimize friction during the adjustment of the device.

These, together with various auxiliary objects of the invention which will later become apparent as the following description proceeds, are realized by my device, one embodiment of which has been illustrated, by way of example only, in the attached drawings, wherein:

Figure 1 is an elevational view showing the installation of the device for a contemplated use;

Figure 2 is a vertical sectional view through the device shown in Figure 1;

Figure 3 is a top plan view taken substantially upon the line 3—3 of Figure 1; and Figure 4 is a perspective view of the support plate forming a part of the device.

Attention is now directed more specifically to the annexed drawings wherein like numerals indicate similar parts throughout the various views, and wherein 10 denotes generally the improved adjustable support. As illustrated generally in Figure 1, the invention comprises a base plate 12 from which rises a column 14 having a cap member 16 through which extends a screw threaded member 18 which detachably receives a support plate 20 which is adapted for engagement with a beam, floor sill or the like indicated at 22 by means of screws or the like 24.

As shown best in Figure 2, the base 12 is formed as a plate-like member which has a centrally disposed vertically arranged bore 26 which latter is counter-bored as at 28 by means of a horizontal shoulder 30, the shoulder 30 and counter-bore 28 being preferably hardened to form a bearing race for an annular series of ball bearings as shown at 32. A generally cylindrical member 34 having a chamfered surface 36 and its upper end 38 laterally enlarged or headed for the purpose of retaining the ball bearings 32 in the counter-bore 28, is received in the bore 26 with its upper and lower surfaces flush with the corresponding surfaces of the base member 12. The circular periphery of the headed portion 38 of the member 34 is spaced from the wall of the counter-bore 28 to provide an annular passageway 40 which passageway is of less diameter than the diameter of the balls 32, whereby the latter are retained in the recess between the inner ball bearing race 36 and the outer race formed by the shoulder 30 and the wall of the counter-bore 28. A tubular column 14 which is preferably of cylindrical cross-section, has its lower end detachably engageable within the passageway 40 and adapted for seating engagement upon the series of balls 32. The upper surface of the tubular member 14 detachably engages and supports as by means of cooperating screw threads 42, an externally positioned cap member 44 which if desired may be rigidly attached to the member 14 as by welding 46. An extensible member 18, screw threadedly engages and extends through the cap member 44, and at its upper extremity is provided with an axially extending diametrically disposed slot 47, which slot is adapted to detachably receive the depending flange 48 of a support plate 50, suitable apertures 52 being provided through said support plate for reception of the screw means 24 as set forth above. At a suitable point intermediate its length, the column 14 is provided with pairs of diametrically disposed apertures 54 through which may be inserted a handle 56 by means of which the column 44 may be rotated relative to the stationary base 12 and the extensible member 18.

From the foregoing description, it is believed that the method of operation of the device will be now apparent. In environment where an adjustable support or jack may be desirable, whether temporary or permanent, the support plate 50 will preferably be anchored or fixed in relation to its load as by means of the fastening means 24. The extensible member 18 is then screwed into the column 14, in contracted relation, and the keyway 47 is next engaged upon the key or flange 48. The lower end of the column 14 is inserted in the passageway 40 of the counter-bore 28 of the base 12, and the latter now placed in position upon its footing or supporting surface. By manipulation of the handle 56 and apertures 54, the column 14 is rotated upon the fixedly secured extensible member 18 and the stationary base 12, the antifriction means 32 facilitating such movement.

When installed in the manner set forth above, to support flooring, beams, construction forms or the like, any sagging which may necessitate subsequent adjustment of the device, may be readily corrected by applying the handle 56 and making the necessary rotational adjustment of the tubular member 14.

What I claim as my invention is:

1. An adjustable support including a base having a recess, anti-friction bearing means in said base recess, a support column rotatably journaled in said recess upon said bearing means, an axially extensible member carried by said column, a support plate detachably and non-rotatably engaging said extensible member and means for rotating said column relative to said base and said extensible member to adjust the length of said support, said recess consisting of a bore extending through said base, a counter-bore in said bore, said counter-bore constituting a bearing cage and a plurality of bearing elements retained in said counter-bore, a bearing inner race received in said recess and extending through said bore, said inner race constituting a retaining means for said bearing elements.

2. An adjustable support including a base having a recess, anti-friction bearing means in said base recess, a support column rotatably journaled in said recess upon said bearing means, an axially extensible member carried by said column, means for rotating said column relative to said base and said extensible member to adjust the length of said support, said recess consisting of a bore extending through said base, a counter-bore in said bore, said counter-bore constituting a bearing cage and a plurality of bearing elements retained in said counter-bore, a bearing inner race received in said recess and extending through said bore, said inner race being spaced from the wall of said counter-bore to define an annular passage therebetween, said column extending into said annular passage and engaging said bearing elements.

3. The combination of claim 2 wherein said inner race provides retaining means for said bearing elements, when said support column is removed from said annular passage.

4. The combination of claim 3 wherein said inner race is non-rotatably secured to said base.

CHARLES L. THOMPSON.

REFERENCES CITED

The following references are of record in the file of this patent:

UNITED STATES PATENTS

| Number | Name | Date |
|---|---|---|
| 349,663 | Robie | Sept. 21, 1886 |
| 772,233 | Jefferson | Oct. 11, 1904 |
| 1,153,697 | Leland | Sept. 14, 1915 |